Figure 1:
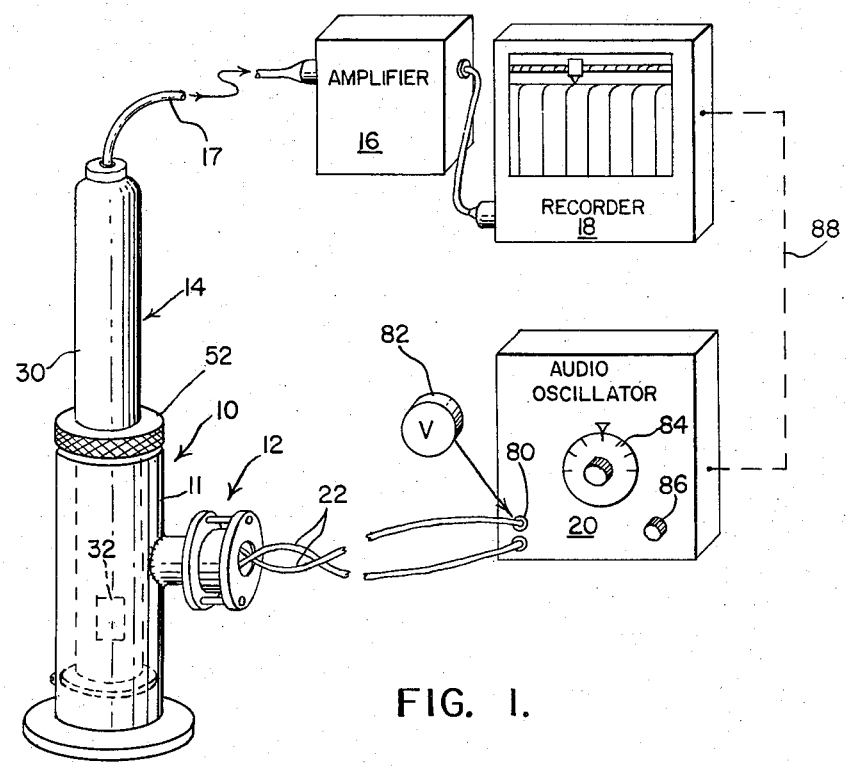

Dec. 22, 1959     E. PODOLAK ET AL     2,918,651
CALIBRATOR FOR UNDERWATER HYDROPHONES
Filed Oct. 27, 1954                                                       2 Sheets-Sheet 1

INVENTORS
EDWARD     PODOLAK
MURRAY     STRASBERG
BY *George Sipkin*
    *B. L. Zanquill*
ATTORNEYS

INVENTORS
EDWARD PODOLAK
MURRAY STRASBERG

BY George Sipkin
B. L. Langweil
ATTORNEYS

2,918,651
CALIBRATOR FOR UNDERWATER HYDROPHONES

Edward Podolak, Bethesda, and Murray Strasberg, Silver Spring, Md., assignors to the United States of America as represented by the Secretary of the Navy Application October 27, 1954, Serial No. 465,158

2 Claims. (Cl. 340—8)

(Granted under Title 35, U.S. Code (1952), sec. 266)

The invention described herein may be manufactured and used by or for the Government of the United States of America without the payment of any royalties thereon or therefor.

The present invention relates to hydrophone calibration apparatus and more particularly to a calibrator for verifying the status of calibration of a previously calibrated hydrophone.

The detection and measurement of noise in water is accomplished by the use of a highly sensitive, submerged hydrophone which is remotely located from other associated equipment comprising the sound detecting and measuring system. The submerged hydrophone is in contact with water and is therefore subjected to hydrostatic pressure, sound pressure, vibration and possible impact by objects in the water. The sensing element for the hydrophone is enclosed within a casing which must be acoustically transparent, that is, the acoustic impedance of the casing must approximate the acoustic impedance of water, and as a result, the casing is generally made of synthetic rubber. The rubber casing, however, fails under certain adverse operating conditions thereby affecting the sensitivity of the sensing element. Both the sensing element and the mechanical support therefor are of delicate construction and as the hydrophone is used during normal operation of the system, the sensitivity of the apparatus changes thereby requiring its replacement. In the event the calibration of the hydrophone cannot be verified periodically, any data collected from use of the hydrophone must be carefully scrutinized for possible errors. The initial calibration and recalibration of a hydrophone in accordance with the prior art, is an elaborate procedure which few laboratories are equipped to perform. Furthermore, considerable time and expense are involved in effecting such calibration, particularly since the hydrophone must be removed and transported to a properly equipped laboratory from a remote point.

One known method in the prior art of recalibrating a hydrophone comprises placing the hydrophone in a chamber of liquid, either water or oil, and in sealing the end of the chamber with a waterproof joint. The side of the chamber is provided with a plate that is driven by a transducer, and output leads are connected to the exposed end of the hydrophone which lead to appropriate recording equipment for measuring the electrical voltage output of the hydrophone. With the hydrophone installed as described, the transducer is energized for creating sound pressure in the liquid which causes a voltage to be generated in the hydrophone. The voltage is transmitted through the output leads to the recording equipment thereby giving a positive indication of the sensitivity of the hydrophone.

There are numerous disadvantages to this prior art method and apparatus for recalibrating a hydrophone. The chamber must be provided with thick walls and special type sealing joints must be used for achieving a fluid-tight fit. The water used inside of the chamber is generally stored in a tank, and as a result, a constant problem of rust and scale on the inside of the tank must be contended with. Further, the presence of minute air bubbles in the liquid within the chamber causes great discrepancies in the sensitivity readings so that the information obtained must be discarded as being wholly in error. Consequently, elaborate precautions have been resorted to in deaerating the liquid and the tank itself when the tank is initially filled. A common method of deaerating comprises the use of vacuum pumps for removing air from the liquid, and maintaining the tank under vacuum while the tank is being filled with the liquid.

The present invention eliminates the above disadvantages by substituting a gas for the liquid in the tank used in the prior art recalibrating apparatus. Although the purpose of the recalibration is to check the sensitivity of a hydrophone immersed in water, we have found that this recalibration can be performed with improved accuracy and convenience in a calibration chamber filled with gas. Further, a driver unit has been modified for use with the gas filled chamber in order to achieve optimum results in the measuring process. The principal results flowing from the use of this novel recalibration equipment is that the apparatus is more reliable since the normal error always introduced by the presence of minute air bubbles in the water have been completely eliminated. The recalibrating process can be made much faster, and by virtue of portability of the equipment, the work can be done in the field thereby effecting an obvious saving in time and expense.

It is therefore an object of the invention to provide a quick and reliable method and apparatus for determining the sensitivity of a hydrophone.

It is another object of the present invention to provide portable apparatus for verifying the calibration of hydrophones under field conditions.

A further object of the invention is the provision of a chamber having a gas serving as a conducting medium for a sound pressure for energizing a hydrophone during a recalibration process.

A still further object of the invention is a method of comparison calibration wherein a hydrophone of unknown sensitivity can be evaluated when compared with a hydrophone of known calibration.

Figure 2:
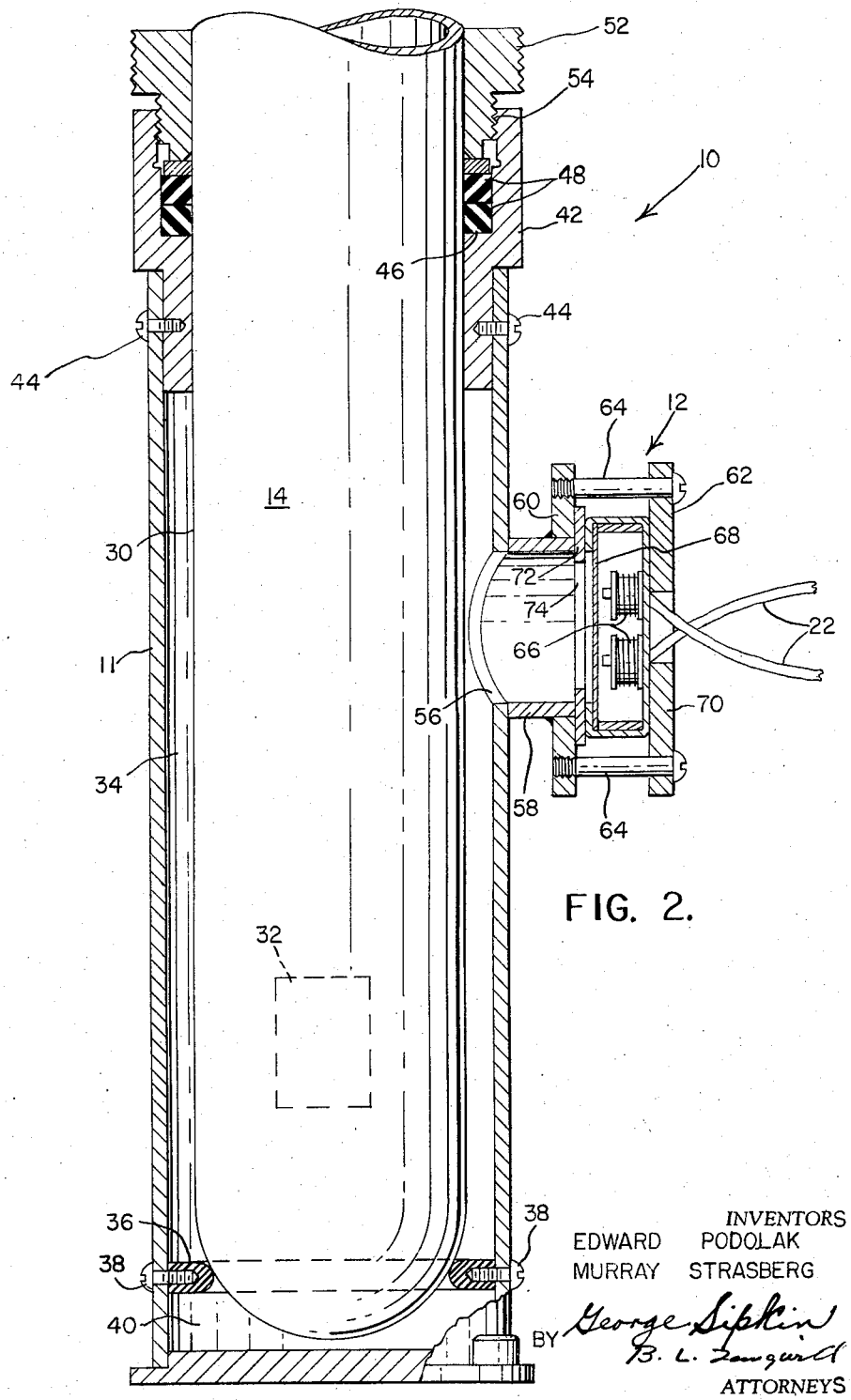

Other objects and many of the attendant advantages of this invention will be readily appreciated as the same becomes better understood by reference to the following detailed description when considered in connection with the accompanying drawings wherein:

Fig. 1 is a diagrammatical showing of a calibrator including associated equipment for determining the sensitivity of a hydrophone; and Fig. 2 is an axial cross-sectional view of a calibrator of the present invention showing details of the sealing joint and the driver unit associated therewith.

Referring now to the drawings wherein the same reference character designates like or corresponding parts throughout the several views, there is shown in Fig. 1 a calibrator 10 comprising a chamber or casing 11 having a transducer 12 affixed in the side thereof for creating sound pressure in the tank. A hydrophone 14, whose sensitivity is being checked, is fitted within the tank 11 and is connected to an amplifier 16 at its other end by means of cable 17. When the hydrophone 14 is excited by the sound pressure generated by transducer 12, the electrical output of the hydrophone is amplified in the amplifier 16 and impressed on a recorder 18 that is preferably mechanically or synchro-coupled to an audio oscillator 20. The output of oscillator 20 is connected to the transducer 12 by means of conductors 22 for providing the transducer 12 with an electrical voltage for generating sound pressure and thereby exciting the hydrophone 14.

Referring more specifically to the parts, the hydrophone 14 comprises an outer tubular casing 30, Figure 2, having at one end, one or more pressure responsive elements 32, such as piezo-electric crystals. A jacket of rubber covers this end of the hydrophone for coupling it to the medium within the tank, whether it be a liquid or gas.

In accordance with the invention, the calibrator 10 is provided in which low frequency sound pressures are created by the transducer which affect the sensitive element of the hydrophone for determining its sensitivity. The calibrator comprises the chamber 11 for receiving hydrophone 14 and a cavity 34 is formed between the walls of the chamber and the outer surface of the hydrophone. The cavity 34 provides an air space around the enclosed part of the hydrophone but the inside dimensions of the cavity are restricted to a value as small as is practicable, since the high frequency response is limited by the longest dimension inside the cavity which determines the first resonance. It will be evident that only one chamber or calibrator is necessary when hydrophones of the same type are being tested since those in the same type are all of the same dimensions.

In order to properly position the hydrophone 14 within the chamber, a ring 36 is affixed adjacent the inside bottom end of the chamber and is held thereto by means of screws 38, or other appropriate securing means. The provision of ring 36 serves to correctly position the hydrophone vertically and coaxially of the chamber, and a water space 40 provided in the bottom serves to collect and contain any water dripping from the hydrophone when it is inserted when wet. A further advantage of the ring is that it decreases the length of the column of air which directly reduces the volume of air that must be driven by the transducer, thereby obtaining a higher sound pressure in the cavity.

From the above, it is apparent that a volume of air must be trapped within cavity 34 for ultimately achieving a proper response of the hydrophone. In order to obtain a fluid tight joint, the upper end of the chamber is sealed by a cylindrical sleeve 42 which snugly fits both the hydrophone and the inner peripheral surface of the chamber and is held in place by means of screws 44. A step 46 is formed on the inner portion of sleeve 42 for receiving packing glands 48 which are compressed by a knurled packing ring 52 acting on threads 54 on the sleeve, thereby providing an effective seal for enclosing the lower part of the hydrophone within chamber 11.

The driver 12, attached to a side of the chamber 11, is a transducer for converting an alternating current or voltage into sonic pressure, and may be of any desired type, such as a dynamic unit or an electro-magnetic unit having a diaphragm, as shown. A circular opening 56 is provided in a side of the chamber 11 and is enclosed by a tubular neck 58 attached thereto by any appropriate securing means, such as welding. The tubular neck 58 is provided with a flange 60 which is spaced from but connected with a mounting plate 62 by a plurality of screws 64. The operating elements of the driver unit are positioned between the mounting plate and flange 60, the elements comprising a receiver similar to a telephone receiver unit. Electro-magnets 66 on plate 62, move a solid diaphragm 68 sealed to an outer casing 70 of the driver unit. An air tight chamber is provided for the driver unit by the insertion of a gasket 72, having an opening 74 therein, which is compressed between the open end of tubular neck 58 and the casing 70. While it is to be understood that other driver units may be employed, the telephone type is convenient, readily available and inexpensive.

The amplifier 16 is of a common type and is provided with a cathode-follower stage to provide a low-impedance source for the cable 17. The recorder 18 is of a type having a movable chart and a laterally movable stylus for recording a graph of the response of the hydrophone with respect to the frequency of a driving audio signal.

The audio oscillator 20 is provided with a jack 80 for reception of leads from a voltmeter 82. The oscillator is further provided with frequency adjustment means 84 and voltage adjustment means 86, as is customary in this type apparatus. The chart moving means of recorder 18 is preferably mechanically or synchro-coupled to the frequency adjustment means 84 of the oscillator 20, such coupling being indicated by the broken lines 88 in Fig. 1 extending between the oscillator and the recorder.

As above-described, the driver 12 is connected to the variable frequency audio oscillator 20, the output voltage of which is monitored by the voltmeter 82. When the electromagnets 66 are energized by the signal from the oscillator, the diaphragm 68 is actuated thereby exciting the volume of air in the cavity 34. The magnitude of the voltage impressed on the driver unit is adjustable. For a given frequency and voltage across the driver unit and a fixed volume of air in the cavity, a sound pressure is created in the calibrator, the absolute magnitude of which need not be known. The hydrophone output then can be measured on an ordinary voltmeter, or through the amplifier and recorder, such as shown in Fig. 1.

In operation, the hydrophone 14 whose calibration is known by a prior free field calibration, is positioned in chamber 11 and the seal closed at the top end thereof. Appropriate connections are then made between an end of the hydrophone and the amplifier, recorder, oscillator, and the driver unit 12. A predetermined frequency and voltage is then selected on the frequency and voltage adjustment means 84 and 86 so that the signal emitted by the oscillator will be of the same frequency as that which was used in the initial calibration of the hydrophone. This signal is then applied to the driver unit which creates a sound pressure in the air within cavity 34 for exciting the hydrophone 14. The output of the hydrophone is amplified by the amplifier 16 and recorded on recorder 18. The hydrophone is then put into use. Either periodically or whenever the calibration of the hydrophone is suspect, the hydrophone is recalibrated by repeating the above steps. If the readings taken again in the tank are the same, the original free-field calibration is still valid. However, if the value is different from that originally observed, then the sensitivity of the hydrophone has changed, the amount of change being determined by the differences between the initial readings and the reading obtained under this test. The above process is then repeated for varying voltages and frequencies and the results obtained compared with that originally made on the hydrophone. Since the recorder 18 is ganged with the frequency control, a graph is drawn, which graph serves to correlate the amplitude output of the hydrophone and the frequency of the oscillator.

The apparatus of this invention can be used for an auxiliary or secondary purpose in that the sensitivity of an unknown hydrophone can be measured when a hydrophone of a known calibration of the same class, is available for use as a standard. This can be accomplished by taking a hydrophone that has been calibrated by a manufacturer or at a testing facility, and knowing its calibration, it can be placed in a tank, the driver energized, and the pressure in the tank measured. The second hydrophone of unknown calibration, but of the same make and type, is then placed in the tank. The driver is supplied with a voltage of the same frequency as that in the first case, and the output of this hydrophone recorded. By comparing the output voltages of the known and unknown hydrophones, the sensitivity of the latter can be easily determined. For example, if the output voltages are the same, the sensitivity of the two hydrophones is the same. If the output of the second unknown hydrophone is half that of the hydrophone of known calibration, then the second hydrophone is one-half as sensitive.

Obviously many modifications and variations of the present invention are possible in light of the above teachings. It is therefore to be understood that within the scope of the appended claims the invention may be practiced otherwise than as specifically described.

What is claimed is:

1. A calibrator for use with a cylindrical hydrophone adapted for immersion in a liquid comprising a cylindrical housing having an open end, means at the upper end of said cylinder for sealing said hydrophone therein thereby forming an air cavity within said housing, a tubular neck sealed to a side of said cylindrical housing in communication with said air cavity, an electromagnetic driver sealed to said neck, said driver being adapted to produce sound pressures in the cavity, a source of alternating current to activate said driver, said source having means to provide an output of a constant predetermined magnitude and adjusting means to adjust the frequency of said output, and recorder means connected to the output of the hydrophone to record the magnitude of the response thereof to the sound pressures for determining the sensitivity of said hydrophone over a range of frequencies.

2. The combination according to claim 1 including a mechanical drive connection between said recorder and said adjusting means, thereby synchronizing the recorder with the adjusting means.

References Cited in the file of this patent

UNITED STATES PATENTS

| 1,536,763 | Brown | May 5, 1925 |
| 2,465,468 | Mott | Mar. 29, 1949 |
| 2,530,383 | Estes | Nov. 21, 1950 |

OTHER REFERENCES

Foldy: Testing Technique, Basic Methods for the Calibration of Sonar Equipment, Summary Technical Report of Division 6, NDRC, vol. 10, Washington, D.C., 1946, p. 59 relied upon.